(12) United States Patent
Mizotani et al.

(10) Patent No.: US 10,603,963 B2
(45) Date of Patent: Mar. 31, 2020

(54) PNEUMATIC TIRE WITH SIDEWALL DECORATIVE PORTION INNER LAYER, PRINT LAYER, AND OUTER LAYER

(71) Applicant: BRIDGESTONE CORPORATION, Chuo-ku, Tokyo (JP)

(72) Inventors: Kentaro Mizotani, Kodaira (JP); Nobuyuki Hirai, Kodaira (JP); Takashi Kuwahara, Higashiyamoto (JP); Yuki Nakamura, Hikone (JP); Keita Oshikane, Tachikawa (JP); Toshio Furutaka, Yokohama (JP); Yasuma Saito, Yokohama (JP); Yukio Sugita, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 497 days.

(21) Appl. No.: 15/502,280

(22) PCT Filed: Jul. 24, 2015

(86) PCT No.: PCT/JP2015/003730
§ 371 (c)(1),
(2) Date: Feb. 7, 2017

(87) PCT Pub. No.: WO2016/021140
PCT Pub. Date: Feb. 11, 2016

(65) Prior Publication Data
US 2017/0225520 A1   Aug. 10, 2017

(30) Foreign Application Priority Data

Aug. 8, 2014 (JP) .................. 2014-163069

(51) Int. Cl.
*B60C 13/04* (2006.01)
*B60C 13/00* (2006.01)

(52) U.S. Cl.
CPC ............ *B60C 13/001* (2013.01); *B60C 13/04* (2013.01); *B60C 2013/006* (2013.01); *B60C 2013/045* (2013.01)

(58) Field of Classification Search
CPC ..... B60C 13/00; B60C 13/001; B60C 13/002; B60C 13/04; B60C 2013/045;
(Continued)

(56) References Cited

U.S. PATENT DOCUMENTS 3,607,498 A    9/1971  Kubota
6,431,236 B1 * 8/2002  Kanenari .............. B60C 13/001
                                                          152/524 X

FOREIGN PATENT DOCUMENTS

CN    103419572 A   12/2013
JP    H04121205 A    4/1992
(Continued)

*Primary Examiner* — Adrienne C. Johnstone
(74) *Attorney, Agent, or Firm* — Kenja IP Law PC

(57) ABSTRACT

Provided is a pneumatic tire including, on an outer surface of its sidewall portion, a decorative portion including a print layer and inner and outer layers respectively disposed on tire inner and outer sides of the print layer. When storage moduli at 25° C. of the print, inner, and outer layers are respectively defined as $E1_{25}'$, $E2_{25}'$, and $E3_{25}'$, $E1_{25}'<E2_{25}'$ and $E1_{25}'<E3_{25}'$ are satisfied. When storage moduli at 80° C. of the print, inner, and outer layers are respectively defined as $E1_{80}'$, $E2_{80}'$, and $E3_{80}'$, and storage modulus variations $\alpha1$, $\alpha2$, and $\alpha3$ at high temperature of the print, inner, and outer layers are respectively defined as $\alpha1=|E1_{25}'-E1_{80}'|/E1_{25}'$, $\alpha2=|E2_{25}'-E2_{80}'|/E2_{25}'$, and $\alpha3=|E3_{25}'-E3_{80}'|/E3_{25}'$, $\alpha1<\alpha2$ and $\alpha1<\alpha3$, and $E2_{25}'>E2_{80}'$ and $E3_{25}'>E3_{80}'$ are satisfied.

3 Claims, 2 Drawing Sheets

(58) Field of Classification Search
CPC .............. B60C 2013/006; B29D 30/72; B29D 2030/726; B29D 2030/728
USPC ................................ 152/524, 525; 156/116
See application file for complete search history.

(56) References Cited

FOREIGN PATENT DOCUMENTS

| | | | |
|---|---|---|---|
| JP | 2000185528 | A | 7/2000 |
| JP | 2002160508 | A | 6/2002 |
| JP | 2007210378 | A | 8/2007 |
| JP | 2009202865 | A | 9/2009 |
| JP | 2013237292 | A | 11/2013 |
| WO | 2007121473 | A1 | 10/2007 |

* cited by examiner

PNEUMATIC TIRE WITH SIDEWALL DECORATIVE PORTION INNER LAYER, PRINT LAYER, AND OUTER LAYER

TECHNICAL FIELD

This disclosure relates to a pneumatic tire.

BACKGROUND

There have been proposed a variety of pneumatic tires (hereinafter, may be simply called tires) provided, on an outer surface of a sidewall portion thereof, with a decorative portion including an annular or other shaped print layer (refer to, for example, Patent Literature 1).

CITATION LIST

Patent Literature

PL1: JP2013237292A

SUMMARY

Technical Problems

In the above regard, when the decorative portion including the print layer as described above is provided in a tire, cracks may occur in the decorative portion due to strain caused by deformation of the tire during running. Accordingly, there is a need for improving durability of the decorative portion. Furthermore, the print layer may peel off when the tire contacts a curbstone or the like. Accordingly, there is also a need for improving resistance to external damage of the decorative portion including the print layer.

Moreover, since a tire is generally used under a severe environment, such as a high-temperature environment, the decorative portion is required to have improved durability and resistance to external damage even under such a high-temperature environment.

The present disclosure has been conceived in light of the above problems, and the present disclosure is to provide a pneumatic tire in which durability and resistance to external damage of the decorative portion in the sidewall portion are improved under a use environment, including a high-temperature environment.

Solution to Problems

A summary of the present disclosure is as follows.

A pneumatic tire including, on an outer surface of a sidewall portion thereof, a decorative portion including a print layer and also including an inner layer and an outer layer respectively disposed on a tire inner side and a tire outer side of the print layer, wherein, when a storage modulus of the print layer measured at 25° C., a storage modulus of the inner layer measured at 25° C., and a storage modulus of the outer layer measured at 25° C. are respectively defined as $E1_{25}'$, $E2_{25}'$, and $E3_{25}'$, the following relational expressions are satisfied:

$E1_{25}' < E2_{25}'$; and $E1_{25}' < E3_{25}'$, and when a storage modulus of the print layer measured at 80° C., a storage modulus of the inner layer measured at 80° C., and a storage modulus of the outer layer measured at 80° C. are respectively defined as $E1_{80}'$, $E2_{80}'$, and $E3_{80}'$, and a storage modulus variation $\alpha 1$ at high temperature of the print layer, a storage modulus variation $\alpha 2$ at high temperature of the inner layer, and a storage modulus variation $\alpha 3$ at high temperature of the outer layer are respectively defined as $\alpha 1 = |E1_{25}' - E1_{80}'|/E1_{25}'$, $\alpha 2 = |E2_{25}' - E2_{80}'|/E2_{25}'$, and $\alpha 3 = |E3_{25}' - E3_{80}'|/E3_{25}'$, the following relational expressions are satisfied:

$\alpha 1 < \alpha 2$; and $\alpha 1 < \alpha 3$, and the following relational expressions are further satisfied:

$E2_{25}' > E2_{80}'$; and $E3_{25}' > E3_{80}'$.

A "storage modulus" refers to a storage modulus that is measured according to JIS K7244.

A "thickness of layer" herein refers to a thickness that is measured at a maximum width position of the layer and measured when the tire is mounted to an applicable rim, filled with a predetermined internal pressure, and placed under no load. Herein, an "applicable rim" refers to a standard rim (which is called a measuring rim in European Tire and Rim Technical Organization [ETRTO] STANDARDS MANUAL and a design rim in the TIRE and RIM ASSOCIATION INC. [TRA] YEAR BOOK) in applicable size specified in industrial standards valid in respective regions where tires are manufactured and used. Examples of such industrial standards include Japan Automobile Tire Manufacturers Association (JATMA) YEAR BOOK in Japan, ETRTO STANDARDS MANUAL in Europe, and the TRA YEAR BOOK in the United States. A "predetermined internal pressure" is an air pressure corresponding to a maximum load capability at applicable size/ply rating specified in the aforementioned JATMA YEAR BOOK etc.

Advantageous Effects

The present disclosure provides a pneumatic tire in which durability and resistance to external damage of the decorative portion in the sidewall portion are improved under a use environment, including a high-temperature environment.

DETAILED DESCRIPTION

Hereinafter, embodiments of the present disclosure will be described in detail for illustration with reference to the drawings.

Figure 1:
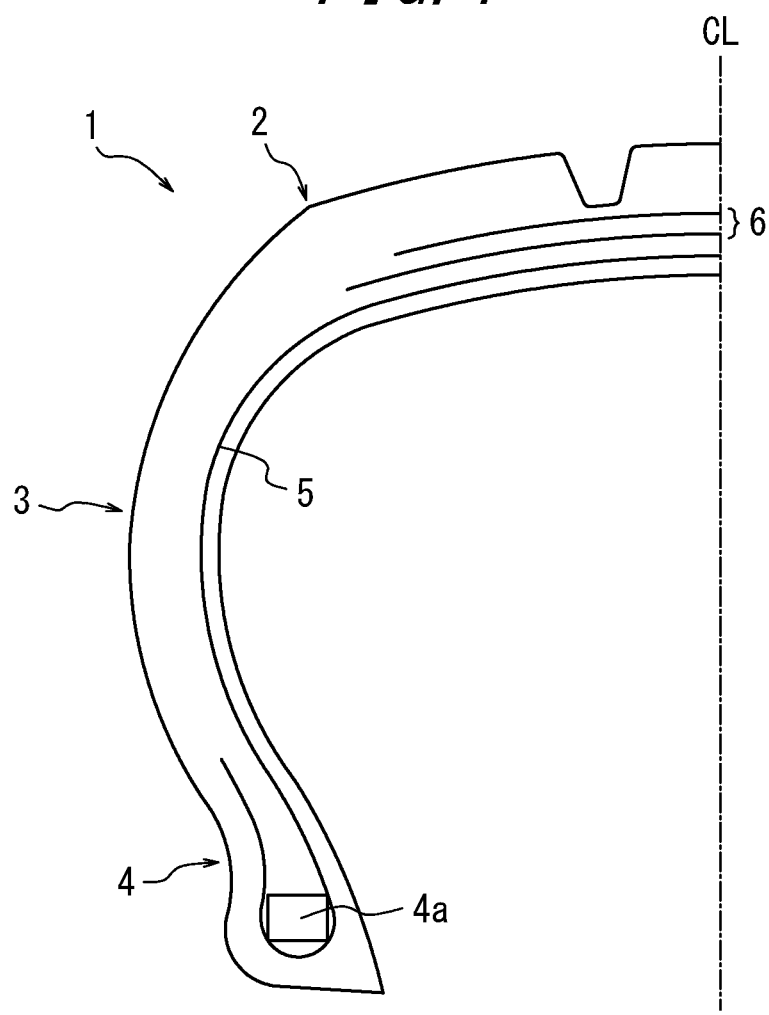
FIG. 1 is a sectional view in a tire width direction of a pneumatic tire according to one of embodiments of the present disclosure.

FIG. 1 is a sectional view in a tire width direction of a pneumatic tire according to one of embodiments of the present disclosure. Although FIG. 1 illustrates only a half portion in the tire width direction that is demarcated by a tire equatorial plane CL as a boundary, the other half portion in the tire width direction, which is not illustrated, has the same structure. As illustrated in FIG. 1, the pneumatic tire 1 includes an annular tread portion 2, which extends continuously in a tire circumferential direction, a pair of sidewall portions 3 (with only one of the sidewall portions 3 illustrated in FIG. 1), which extends contiguously with sides of the tread portion 2 toward an inner side in a tire radial direction, and a pair of bead portions 4 (with only one of the bead portions 4 illustrated in FIG. 1), which is contiguous with inner sides in the tire radial direction of the side wall portions 3. Herein, although an internal structure of the tire is not particularly limited, the tire 1 in an example of FIG. 1 includes a carcass 5, which extends toroidally between a pair of bead cores 4a (with only one of the bead cores 4a illustrated in FIG. 1) embedded in the bead portions 4, and a belt 6, which is disposed on the outer side in the tire radial direction of the carcass 5 and which includes two belt layers in this example.

Figure 2:
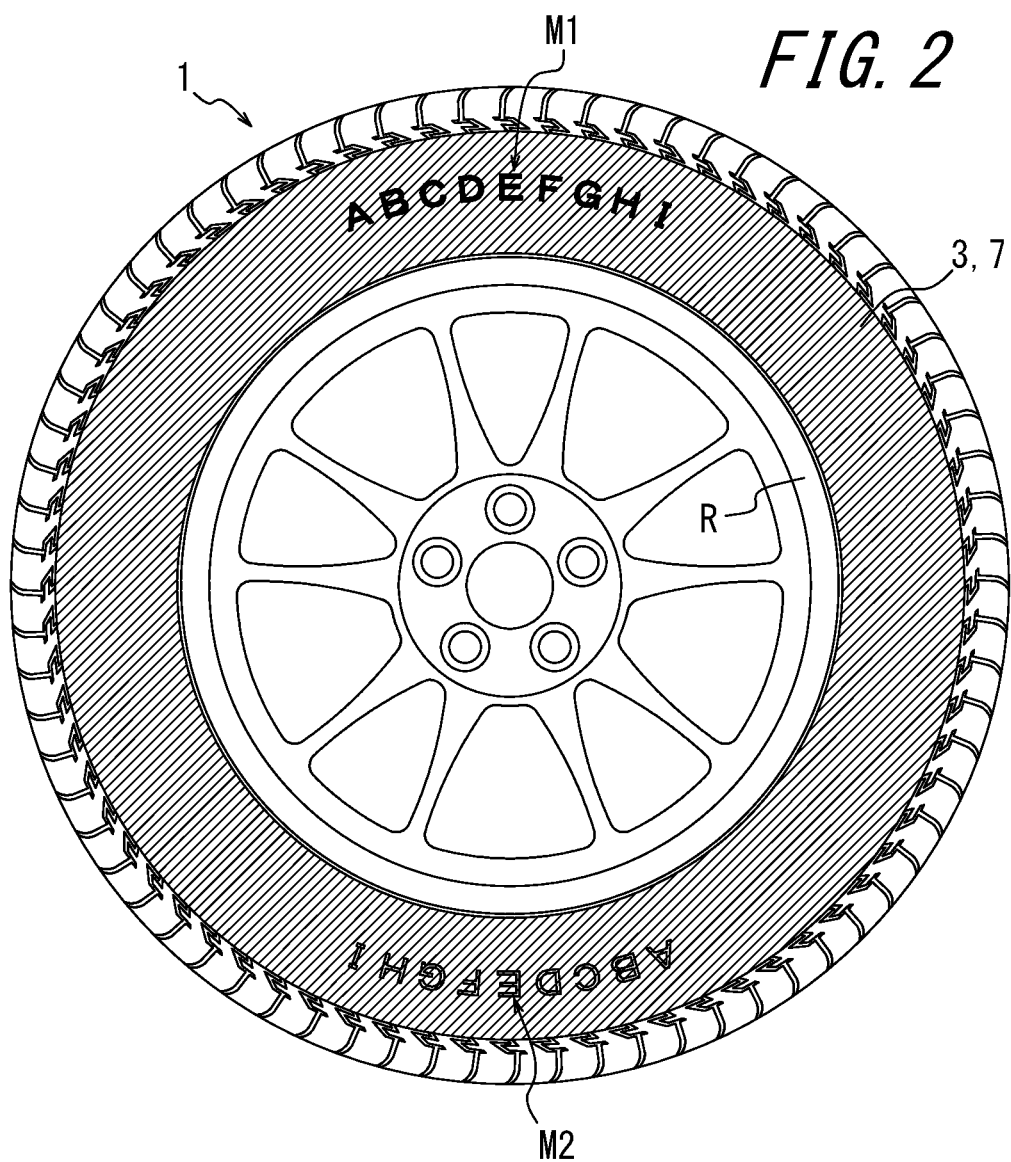
FIG. 2 is a side view of a tire-rim assembly in which a pneumatic tire is mounted to a rim according to one of embodiments of the present disclosure.

FIG. 2 is a side view of a tire-rim assembly in which a pneumatic tire is mounted to an applicable rim according to one of embodiments of the present disclosure. As illustrated in FIG. 2, the tire 1 is mounted to an applicable rim R, and the tire 1 includes, on an outer surface 3a of the sidewall portion 3, an annular decorative portion 7. In the illustrated example, markings M1 and M2, which include alphabets, are applied to two positions on a circumference of the decorative portion 7.

Figure 3:
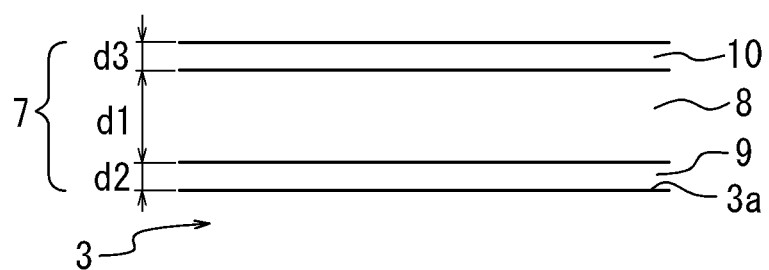
FIG. 3 is a partial sectional view schematically illustrating a decorative portion and a sidewall portion.

Reference is next made to FIG. 3, which is a partial sectional view schematically illustrating the decorative portion 7 and the sidewall portion 3. As illustrated in FIG. 3, the decorative portion 7 includes a print layer 8 and also includes an inner layer 9 and an outer layer 10, which are respectively disposed on the tire inner side and the tire outer side of the print layer 8.

In the present embodiment herein, the print layer 8 may be formed by applying paint, such as ink, to the outer surface 3a of the sidewall portion 3 by screen printing, ink jet printing, relief printing, or another printing process.

The print layer 8 may have a laminated structure of a white-paint layer and a color-paint layer (in any color other than white) disposed on the tire outer side of the white-paint layer. To produce the decorative portion 7 with excellent color density, it is preferable to make the white-paint layer thicker than the color-paint layer. The above laminated structure may be applied to an entirety or part of the circumference of the print layer 8. The color-paint layer may be laminated directly on a surface of the white-paint layer or may be formed via a primer layer. However, the print layer 8 may also be formed only by the color-paint layer (in any color other than white), and in this case, to ensure color density, the inner layer 9 is preferably white.

In the present disclosure herein, examples of materials of the print layer 8 may include, but not particularly limited to, active energy ray curing ink that is composed mainly of oligomer, monomer, and a coloring agent and that also contains, as needed, a photopolymerization initiator, an ultraviolet absorbing agent, an antioxidant, a light stabilizer, an adhesion promoter, a rheology control agent, a dispersant, or the like. The storage moduli $E1_{25}'$ and $E1_{80}'$ of the print layer 8 may be regulated to be within predetermined ranges by controlling the amounts of the above materials. In more detail, for example, UF-245 ink series manufactured by DNP Fine Chemicals Co., Ltd. may be used as materials of the print layer 8. Examples of materials of the inner layer 9 and the outer layer 10 may include, but not particularly limited to, active energy ray curing ink for forming the intermediate layers that is composed mainly of oligomer and monomer and that also contains, as needed, a photopolymerization initiator, an ultraviolet absorbing agent, an antioxidant, a light stabilizer, an adhesion promoter, a theology control agent, or the like. The storage moduli $E2_{25}'$ and $E2_{80}'$ of the inner layer 9 and the storage moduli $E3_{25}'$ and $E3_{80}'$ of the outer layer 10 may be regulated to be within predetermined ranges by controlling the amounts of the above materials. In more detail, for example, UF-64 ink series manufactured by DNP Fine Chemicals Co., Ltd. may be used as materials of the inner layer 9 and the outer layer 10. Additionally, examples of an active energy ray may include an α-ray, a γ-ray, an X-ray, an ultraviolet ray, and an electron beam.

In the present embodiment, at least the outer layer 10, which is disposed on the tire outer side, among the inner layer 9 and the outer layer 10 is formed as a transparent layer so that the print layer 8 is visible.

Meanwhile, when a storage modulus of the print layer 8 measured at a temperature of 25° C., a storage modulus of the inner layer 9 measured at 25° C., and a storage modulus of the outer layer 10 measured at 25° C. are respectively defined as $E1_{25}'$, $E2_{25}'$, and $E3_{25}'$, the pneumatic tire of the present embodiment satisfies the following relational expressions:

$$E1_{25}'<E2_{25}'; \text{ and } E1_{25}'<E3_{25}'.$$

Furthermore, when a storage modulus of the print layer 8 measured at 80° C., a storage modulus of the inner layer 9 measured at 80° C., and a storage modulus of the outer layer 10 measured at 80° C. are respectively defined as $E1_{80}'$, $E2_{80}'$, and $E3_{80}'$, and a storage modulus variation α1 at high temperature of the print layer 8, a storage modulus variation α2 at high temperature of the inner layer 9, and a storage modulus variation α3 at high temperature of the outer layer 10 are respectively defined as $$\alpha 1 = |E1_{25}'-E1_{80}'|/E1_{25}',$$

$$\alpha 2 = |E2_{25}'-E2_{80}'|/E2_{25}', \text{ and}$$

$$\alpha 3 = |E3_{25}'-E3_{80}'|/E3_{25}',$$

the pneumatic tire of the present embodiment satisfies following relational expressions:

$$\alpha 1 < \alpha 2; \text{ and } \alpha 1 < \alpha 3, \text{ and}$$

the pneumatic tire of the present embodiment further satisfies the following relational expressions:

$$E2_{25}'>E2_{80}'; \text{ and } E3_{25}'>E3_{80}'.$$

The following describes effects of the pneumatic tire of the present embodiment.

According to the pneumatic tire of the present embodiment, first of all, the print layer 8, which has a low storage modulus measured at 25° C., is sandwiched between the inner layer 9 and the outer layer 10, which have high storage moduli measured at 25° C. Accordingly, durability of the decorative portion 7 is improved by the print layer 8 absorbing strain during deformation of the tire, and resistance to external damage of the decorative portion 7 is improved by the inner layer 9 and the outer layer 10. Especially, since having a relatively low storage modulus variance α1 at high temperature relative to room temperature, the print layer 8, with this temperature dependability, provides the effect of absorbing strain during deformation of the tire even under a high-temperature environment. Furthermore, the inner layer 9 and the outer layer 10 has relatively high storage modulus variances α2 and α3 at high temperature relative to normal temperature, and the storage moduli are decreased. Accordingly, under a high-temperature environment, where more significant strain occurs due to deformation of the tire, differences in rigidity among the layers are mitigated, and durability of the decorative portion 7 is maintained, and adhesion with respect to the tire is also ensured.

Thus, the pneumatic tire of the present embodiment improves durability and resistance to external damage of the decorative portion in the sidewall portion under a use environment, including a high-temperature environment.

In the present disclosure herein, the inner layer 9 and the outer layer 10 are preferably made of the same material. By doing so, when, for example, the inner layer 9 and the outer layer 10 are formed in a wider range than a range over which the print layer 8 is formed, adhesiveness between an edge portion of the inner layer 9 and an edge portion of the outer layer 10 is improved. This further improves durability and resistance to external damage of the decorative portion 7 in the sidewall portion 3 and is also preferable in terms of productivity and cost.

Furthermore, the pneumatic tire according to the present disclosure preferably satisfies the following relational expressions:

$$E2_{25}'/E1_{25}' \leq 7.1; \text{ and } E3_{25}'/E1_{25}' \leq 7.1.$$

When the above numerical ranges are satisfied, excessive differences in rigidity between the print layer 8 and the inner layer 9 and between the print layer 8 and the outer layer 10 are prevented, and durability of the decorative portion 7 is improved.

Moreover, in the pneumatic tire according to the present disclosure, preferably, the decorative portion 7 further includes a protective layer on the tire outer side of the outer layer 10. A storage modulus $E4_{25}'$ of the protective layer measured at 25° C. is preferably higher than the storage modulus $E3_{25}'$ of the outer layer 10 measured at 25° C. With the above structure, resistance to external damage of the decorative portion 7 is further improved. Examples of materials of the protective layer may include, but not particularly limited to, (meth)acrylic acid-based resin or resin obtained by silicone-modification of (meth)acrylic acid-based resin. In addition to such resin, urethane-based resin or any resin containing resin obtained by carbonate-modification of urethane-based resin may also be used. Herein, the storage modulus $E4_{25}'$ of the protective layer may be regulated to be within a predetermined range by controlling the amounts of the above materials. In more detail, as materials of the protective layer, for example, "OP-SA13", "OP-SA79", "OP-SA355", and "OP-SA356" manufactured by DNP Fine Chemicals Co., Ltd. may be considered as (meth)acrylic acid-based resin or resin obtained by silicone-modification of (meth)acrylic acid-based resin, and "OP-U354" manufactured by DNP Fine Chemicals Co., Ltd. may be considered as urethane-based resin or resin obtained by carbonate-modification of urethane-based resin.

In detail, from the perspective of improving resistance to external damage in the protective layer, which has a high storage modulus, and maintaining durability in the print layer 8, which has a low storage modulus, the storage modulus $E1_{25}'$ of the print layer 8 is preferably $4.0 \times 10^6$ (Pa) or less, and the storage modulus $E4_{25}'$ of the protective layer is preferably $1.0 \times 10^7$ (Pa) or more.

On the other hand, from the perspective of maintaining durability of the decorative portion 7 by preventing excessive differences in rigidity in the decorative portion 7, the storage modulus $E1_{25}'$ of the print layer 8 is preferably $5.0 \times 10^5$ (Pa) or more, and the storage modulus $E4_{25}'$ of the protective layer is preferably $5.0 \times 10^8$ (Pa) or 1 es.

Moreover, in the pneumatic tire according to the present disclosure, when a storage modulus measured at 25° C. of side rubber (rubber constituting the sidewall portion 3) that is adjacent to the tire inner side of the decorative portion 7 is defined as $E5_{25}'$, the following relational expression is preferably satisfied:

$$E1_{25}' < E5_{25}', \text{ and}$$

the following relational expressions are more preferably satisfied:

$$E2_{25}' < E5_{25}'; \text{ and } E3_{25}' < E5_{25}'.$$

When the above relational expressions are satisfied, the print layer 8, the inner layer 9, and the outer layer 10 are even better adaptive to strain of side rubber caused especially by deformation of the sidewall portion 3 of the tire, and durability of the decorative portion 7 is even further improved.

Herein, in the pneumatic tire according to the present disclosure, when a thickness of the print layer 8 is defined as d1, a thickness of the inner layer 9 is defined as d2, and a thickness of the outer layer 10 is defined as d3, the following relational expressions are preferably satisfied:

$$d1 > d2; \text{ and } d1 > d3.$$

Increasing the thickness of the layer which has a low storage modulus and is soft further improves adaptivity to strain caused by deformation of the tire, and accordingly, further improves durability of the decorative portion 7.

Moreover, in the pneumatic tire according to the present disclosure, when a thickness of the print layer 8, a thickness of the inner layer 9, a thickness of the outer layer 10, and a total thickness of the print layer 8, the inner layer 9, and the outer layer 10 are respectively defined as d1, d2, d3, and d4, the following relational expression is preferably satisfied:

$$\tfrac{1}{2} \leq d1/d4 \leq \tfrac{4}{5}.$$

When the ratio d1/d4 is ½ or more, the thickness of the layer which has a low storage modulus and is soft is increased, and adaptivity to strain caused by deformation of the tire is increased, and thus, durability of the decorative portion 7 is further improved. On the other hand, when the ratio d1/d4 is ⅘ or less, relative thicknesses of the inner layer 9 and the outer layer 10 are ensured, and thus, resistance to external damage of the decorative portion 7 is further improved.

For example, to further ensure both durability and resistance to external damage of the decorative portion 7, the thickness d1 of the print layer 8 is preferably 40 μm or less, and the thickness d2 of the inner layer 9 and the thickness d3 of the outer layer 10 are preferably from 10 to 20 μm.

Moreover, in the pneumatic tire according to the present disclosure, contrast ratios of the inner layer 9 and the outer layer 10 are preferably less than the contrast ratio of the print layer 8.

Reducing the contrast ratios of the inner layer 9 and the outer layer 10 creates a catch due to microscopic irregularities and accordingly, further improves adhesiveness. Furthermore, low contrast ratios creates a region over which paint is not applied microscopically, and strain is released. Accordingly, durability of the decorative portion 7 is further improved. Herein, a "contrast ratio" refers to a paint area per unit area on a tire surface and may be obtained, for example, by measuring an area over which paint is applied through image processing with a microscope.

That is to say, although the inner layer 9 and the outer layer 10 are formed in the wider range than the range over which the print layer 8 is formed, the paint area thereof is preferably less than the paint area of the print layer 8 as viewed microscopically at a unit area of the sidewall portion 3.

Examples

To confirm the effects of the present disclosure, tires according to Examples 1 to 6 and a tire according to Comparative Example 1 were experimentally produced and each tested for evaluating durability and resistance to external damage of the decorative portion. The tires each have the common internal structure as illustrated in FIG. 1 and include, on the outer surface of the sidewall portion, the decorative portion including the print layer, the inner layer, and the outer layer. The tires have specifications shown in Table 1 below and are common in terms of other specifications not listed in Table 1.

<Durability of Decorative Portion>

Each tire was mounted to an applicable rim, filled with a prescribed internal pressure, and installed on a vehicle. Then, after driven for 20,000 km on the actual vehicle, each tire was tested to measure the length of a crack occurring in the decorative portion for evaluating durability of the decorative portion. The evaluation is expressed as an index value, with the result for the tire according to Comparative Example 1 as 100. A larger value indicates better durability of the decorative portion.

<Resistance to External Damage of Decorative Portion>

For each of the tires, the decorative portion was subjected to a scratch test with a coin under a load condition of 1200 g, and thus, resistance to external damage of the decorative portion was evaluated. The evaluation is expressed as an index value, with the result for the tire according to Comparative Example 1 as 100. A larger value indicates better resistance to external damage of the decorative portion.

The evaluation results are shown in Table 1 below.

As can be seen from Table 1, the tires according to Examples 1 to 6 are superior in durability and resistance to external damage of the decorative portion to the tire according to Comparative Example 1. Furthermore, a comparison of Example 1 and Example 2 shows that Example 1, which satisfies the relational expressions d1>d2 and d1>d3, is superior in durability of the decorative portion 7. Comparisons among Example 1 and Examples 3 to 6 also show that Examples 1, 4, and 5, which satisfy the relational expression ½≤d1/d4≤⅘, are superior in durability and resistance to external damage of the decorative portion 7 to Examples 3 and 6.

REFERENCE SIGNS LIST

1 Pneumatic tire
2 Tread portion
3 Sidewall portion
4 Bead portion
4a Bead core
5 Carcass
6 Belt
7 Decorative portion
8 Print layer
9 Inner layer
10 Outer layer

The invention claimed is:

1. A pneumatic tire comprising an annular tread portion, a pair of sidewall portions extending contiguously with sides of the tread portion radially inwardly, a pair of bead portions extending contiguously with radially inner sides of the sidewall portions radially inwardly, and a decorative portion on an axially outer surface of at least one of the pair of sidewall portions, the decorative portion including a print layer and also including an inner layer and an outer layer respectively disposed on a tire inner side and a tire outer side of the print layer, wherein, when a storage modulus of the print layer measured at 25° C., a storage modulus of the inner layer measured at 25°

TABLE 1

|  | Example 1 | Example 2 | Example 3 | Example 4 | Example 5 | Example 6 | Comparative Example 1 |
| --- | --- | --- | --- | --- | --- | --- | --- |
| $E1_{25}'$ (Pa) | $9.8 \times 10^5$ | $9.8 \times 10^5$ | $9.8 \times 10^5$ | $9.8 \times 10^5$ | $9.8 \times 10^5$ | $9.8 \times 10^5$ | $1.1 \times 10^6$ |
| $E2_{25}'$ (Pa) | $4.9 \times 10^6$ | $4.9 \times 10^6$ | $4.9 \times 10^6$ | $4.9 \times 10^6$ | $4.9 \times 10^6$ | $4.9 \times 10^6$ | $1.1 \times 10^6$ |
| $E3_{25}'$ (Pa) | $4.9 \times 10^6$ | $4.9 \times 10^6$ | $4.9 \times 10^6$ | $4.9 \times 10^6$ | $4.9 \times 10^6$ | $4.9 \times 10^6$ | $1.1 \times 10^6$ |
| $E1_{25}' < E2_{25}'$ | Satisfied | Satisfied | Satisfied | Satisfied | Satisfied | Satisfied | Unsatisfied |
| $E2_{25}' < E3_{25}'$ | Satisfied | Satisfied | Satisfied | Satisfied | Satisfied | Satisfied | Unsatisfied |
| $E1_{80}'$ (Pa) | $1.1 \times 10^6$ | $1.1 \times 10^6$ | $1.1 \times 10^6$ | $1.1 \times 10^6$ | $1.1 \times 10^6$ | $1.1 \times 10^6$ | $8.8 \times 10^5$ |
| $E2_{80}'$ (Pa) | $3.7 \times 10^6$ | $3.7 \times 10^6$ | $3.7 \times 10^6$ | $3.7 \times 10^6$ | $3.7 \times 10^6$ | $3.7 \times 10^6$ | $2.7 \times 10^5$ |
| $E3_{80}'$ (Pa) | $3.7 \times 10^6$ | $3.7 \times 10^6$ | $3.7 \times 10^6$ | $3.7 \times 10^6$ | $3.7 \times 10^6$ | $3.7 \times 10^6$ | $2.7 \times 10^5$ |
| α1 | 0.12 | 0.12 | 0.12 | 0.12 | 0.12 | 0.12 | 0.20 |
| α2 | 0.24 | 0.24 | 0.24 | 0.24 | 0.24 | 0.24 | 0.75 |
| α3 | 0.24 | 0.24 | 0.24 | 0.24 | 0.24 | 0.24 | 0.75 |
| d1 (μm) | 40 | 40 | 40 | 40 | 40 | 40 | 40 |
| d2 (μm) | 10 | 50 | 30 | 20 | 5 | 2 | 10 |
| d3 (μm) | 10 | 10 | 30 | 20 | 5 | 2 | 10 |
| d4 (μm) | 60 | 100 | 100 | 80 | 50 | 44 | 60 |
| d1 > d2 | Satisfied | Unsatisfied | Satisfied | Satisfied | Satisfied | Satisfied | Satisfied |
| d1 > d3 | Satisfied | Unsatisfied | Satisfied | Satisfied | Satisfied | Satisfied | Satisfied |
| Ratio d1/d4 | 0.7 | 0.4 | 0.4 | 0.5 | 0.8 | 0.9 | 0.7 |
| Durability of decorative portion | 3000 | 1000 | 1000 | 2500 | 2000 | 2500 | 100 |
| Resistance to external damage of decorative portion | 200 | 120 | 120 | 167 | 133 | 107 | 100 |

C., and a storage modulus of the outer layer measured at 25° C. are respectively defined as $E1_{25}'$, $E2_{25}'$, and $E3_{25}'$, the following relational expressions are satisfied:

$E1_{25}' < E2_{25}$; and $E1_{25}' < E3_{25}'$, and when a storage modulus of the print layer measured at 80° C., a storage modulus of the inner layer measured at 80° C., and a storage modulus of the outer layer measured at 80° C. are respectively defined as $E1_{80}'$, $E2_{80}'$, and $E3_{80}'$, and a storage modulus variation $\alpha 1$ at high temperature of the print layer, a storage modulus variation $\alpha 2$ at high temperature of the inner layer, and a storage modulus variation $\alpha 3$ at high temperature of the outer layer are respectively defined as $\alpha 1 = |E1_{25}' - E1_{80}'|/E1_{25}'$, $\alpha 2 = |E2_{25}' - E2_{80}'|/E2_{25}'$, and $\alpha 3 = |E3_{25}' - E3_{80}'|/E3_{25}'$, the following relational expressions are satisfied:

$\alpha 1 < \alpha 2$; and $\alpha 1 < \alpha 3$, and the following relational expressions are further satisfied:

$E2_{25}' > E2_{80}'$; and $E3_{25}' > E3_{80}'$.

2. The pneumatic tire according to claim 1, wherein, when a thickness of the print layer, a thickness of the inner layer, and a thickness of the outer layer are respectively defined as d1, d2, and d3, the following relational expressions are satisfied:

$d1 > d2$; and $d1 > d3$.

3. The pneumatic tire according to claim 1, wherein, when a thickness of the print layer, a thickness of the inner layer, a thickness of the outer layer, and a total thickness of the print layer, the inner layer, and the outer layer are respectively defined as d1, d2, d3, and d4, the following relational expression is satisfied:

$1/2 \leq d1/d4 \leq 4/5$.

* * * * *